United States Patent
Curtin

(10) Patent No.: US 10,216,933 B1
(45) Date of Patent: Feb. 26, 2019

(54) SYSTEMS AND METHODS FOR DETERMINING WHETHER MALICIOUS FILES ARE TARGETED

(71) Applicant: Symantec Corporation, Mountain View, CA (US)

(72) Inventor: Ryan Ross Curtin, Atlanta, GA (US)

(73) Assignee: Symantec Corporation, Mountain View, CA (US)

(*) Notice: Subject to any disclaimer, the term of this patent is extended or adjusted under 35 U.S.C. 154(b) by 208 days.

(21) Appl. No.: 15/268,260

(22) Filed: Sep. 16, 2016

(51) Int. Cl.
| | | |
|---|---|---|
| H04L 29/06 | (2006.01) | |
| G06F 21/55 | (2013.01) | |
| G06F 21/56 | (2013.01) | |
| G06F 17/30 | (2006.01) | |
| G06N 99/00 | (2010.01) | |
| G06F 11/30 | (2006.01) | |

(52) U.S. Cl.
CPC ...... *G06F 21/565* (2013.01); *G06F 17/30091* (2013.01); *G06F 21/552* (2013.01); *G06F 21/554* (2013.01); *G06F 21/564* (2013.01); *G06N 99/005* (2013.01); *H04L 63/1416* (2013.01); *H04L 63/1425* (2013.01); *H04L 63/1441* (2013.01)

(58) Field of Classification Search
CPC . H04L 63/1416; H04L 63/1425; H04L 63/14; H04L 63/1441; H04L 63/1408; H04L 63/145; H04L 2463/144; G06F 21/564; G06F 21/565; G06F 21/552; G06F 21/554; G06F 21/561; G06F 17/30091; G06F 17/56; G06N 99/005; G06N 3/0454; G06N 5/025; G06Q 10/107
See application file for complete search history.

(56) References Cited

U.S. PATENT DOCUMENTS

| | | | | |
|---|---|---|---|---|
| 8,418,249 B1 * | 4/2013 | Nucci | ............... | G06F 21/552 706/20 |
| 8,595,830 B1 * | 11/2013 | Lee | ............... | H04L 63/1416 705/58 |

(Continued)

OTHER PUBLICATIONS

Ezefosie, Nkirue. A Data Driven Anomaly based behavior detection method for Advanced Persistent Threats (APT). Diss. Jun. 2016. (Year: 2016).*

(Continued)

*Primary Examiner* — Michael Simitoski
(74) *Attorney, Agent, or Firm* — FisherBroyles, LLP

(57) ABSTRACT

The disclosed computer-implemented method for determining whether malicious files are targeted may include (i) applying, to a malware detection structure, a plurality of sample data points, each sample data point corresponding to at least one of a malicious file known to be targeted and a malicious file known to be non-targeted, (ii) identifying one or more boundaries of the sample data points within the malware detection structure, (iii) determining, after identifying the sample boundaries, that a new data point falls outside of the boundaries, and (iv) classifying a malicious file associated with the new data point as non-targeted in response to determining that the new data point falls outside of the sample boundaries. Various other methods, systems, and computer-readable media are also disclosed.

20 Claims, 8 Drawing Sheets

(56) References Cited

U.S. PATENT DOCUMENTS

| | | | | |
|---|---|---|---|---|
| 8,935,788 | B1* | 1/2015 | Diao | G06F 21/561 726/24 |
| 9,185,119 | B1* | 11/2015 | Tamersoy | H04L 63/14 |
| 9,223,966 | B1* | 12/2015 | Satish | G06F 21/53 |
| 9,690,938 | B1* | 6/2017 | Saxe | G06F 21/563 |
| 9,860,272 | B2* | 1/2018 | Yablokov | H04L 63/1466 |
| 2007/0239999 | A1* | 10/2007 | Honig | G06F 21/554 713/194 |
| 2008/0104703 | A1* | 5/2008 | Rihn | G06F 21/56 726/24 |
| 2010/0281539 | A1* | 11/2010 | Burns | H04L 63/1441 726/23 |
| 2012/0054184 | A1* | 3/2012 | Masud | G06F 17/30598 707/737 |
| 2013/0104230 | A1* | 4/2013 | Tang | G06F 21/552 726/23 |
| 2014/0165198 | A1* | 6/2014 | Altman | H04L 63/145 726/23 |
| 2015/0058982 | A1* | 2/2015 | Eskin | H04L 63/1425 726/23 |
| 2016/0103992 | A1* | 4/2016 | Roundy | G06F 21/554 726/23 |
| 2016/0275289 | A1* | 9/2016 | Sethumadhavan | G06F 21/552 |
| 2017/0063893 | A1* | 3/2017 | Franc | H04L 63/0281 |
| 2017/0324767 | A1* | 11/2017 | Srivastava | H04L 12/14 |
| 2018/0034838 | A1* | 2/2018 | Jusko | H04L 63/1425 |
| 2018/0063161 | A1* | 3/2018 | Kopp | H04L 63/1441 |

OTHER PUBLICATIONS

Dewan, Prateek, Anand Kashyap, and Ponnurangam Kumaraguru. "Analyzing social and stylometric features to identify spear phishing ennails." Electronic Crime Research (eCrime), 2014 APWG Symposium on. IEEE, 2014. (Year: 2016).*

Hardy, Seth, et al. "Targeted Threat Index: Characterizing and Quantifying Politically-Motivated Targeted Malware." USENIX Security Symposium. 2014. (Year: 2014).*

Kong, Deguang, and Guanhua Yan. "Transductive malware label propagation: Find your lineage from your neighbors." INFOCOM, 2014 Proceedings IEEE. IEEE, 2014. (Year: 2014).*

Nath, Hiran V., and Babu M. Mehtre. "Static malware analysis using machine learning methods." International Conference on Security in Computer Networks and Distributed Systems. Springer, Berlin, Heidelberg, 2014. (Year: 2014).*

Sethi, Jyoti Ranjan. Study of Distance-Based Outlier Detection Methods. Diss. 2013. (Year: 2013).*

Shabtai, Asaf, et al. "Detection of malicious code by applying machine learning classifiers on static features: A state-of-the-art survey." information security technical report 14.1 (2009): 16-29. (Year: 2009).*

Ye, Yanfang, et al. "Automatic malware categorization using cluster ensemble." Proceedings of the 16th ACM SIGKDD international conference on Knowledge discovery and data mining. ACM, 2010. (Year: 2010).*

Computer File; https://en.wikipedia.org/wiki/Computer_file; as accessed Jan. 2, 2017; (Feb. 4, 2004).

Targeted Threat; https://en.wikipedia.org/wiki/Targeted_threat; as accessed Jan. 2, 2017; (Nov. 12, 2011).

Jon Louis Bentley; Multidimensional binary search trees used for associative searching; http://dl.acm.org/citation.cfm?doid=361002.361007; (Sep. 1975).

K-D-Tree; https://en.wikipedia.org/wiki/K-d_tree; as accessed Jan. 2, 2017; (Dec. 15, 2005).

Breiman; Random Forests, as accessed Jan. 2, 2017; (Sep. 1999).

Chaudhary et al.; Very Fast Outlier Detection in Large Multidimensional Data Sets; (Jan. 1, 2001).

Local Outlier Factor; https://en.wikipedia.org/wiki/Local_outlier_factor; as accessed Jan. 2, 2017; (May 24, 2013).

One Class Support Vector Machine; https://msdn.microsoft.com/en-us/library/azure/dn913103.aspx; as accessed Jan. 2, 2017; (Jun. 20, 2016).

Deep Learning; https://en.wikipedia.org/wiki/Deep_learning#Deep_neural_network_architectures; as accessed Jan. 2, 2017; (Jun. 20, 2010).

Random Forest; https://en.wikipedia.org/wiki/Random_forest; (Jan. 30, 2005).

Friedman, J.H. and Rafsky, L.C. 'Multivariate generalizations of the Wald-Wolfowitz and Smirnov two-sample tests.' Annals of Statistics, 7(4):697-717, 1979.

Hall, Peter, and Nader Tajvidi. "Permutation Tests for Equality of Distributions in High-Dimensional Settings." Biometrika, vol. 89, No. 2, 2002, pp. 359-374. www.jstor.org/stable/4140582.

Gretton, A., Borgwardt, K.M., Rasch, M., Schoelkopf, B., and Smola, A.J. 'A kernel method for the two-sample problem'. Advances in Neural Information Processing Systems 20 (NIPS 2006), pp. 513-520, Apr. 2008.

Dries, A. and Rueckert, U. 'Adaptive concept drift detection.' Statistical Analysis and Data Mining 2.5-6, pp. 311-327, 2009.

Anderson, N. H, Hall, P., and Titterington, D.M. 'Two-sample test statistics for measuring discrepancies between two multivariate probability density functions using kernel-based density estimates.' Journal of Multivariate Analysis, 50(1):41-54, 1994.

B.W. Silverman; Density Estimation for Statistics and Data Analysis, Chapter 1 and 2; Apr. 17, 2003.

Ram, P. and Gray, A.; Density Estimation Trees; Aug. 2011.

Ryan Curtin et al.; Systems and Methods for Detecting Label Drift Using Density Estimation in Machine-Learning Classification Systems; U.S. Appl. No. 15/429,444, filed Feb. 10, 2017.

\* cited by examiner

SYSTEMS AND METHODS FOR DETERMINING WHETHER MALICIOUS FILES ARE TARGETED

BACKGROUND

Organizations attempting to combat cyber-attacks have an interest in knowing whether malicious files are targeted to a specific recipient. Conventionally, this determination is made via manual labeling by analysts. However, manual labeling may be time intensive and, in consequence, difficult to scale. Unfortunately, traditional machine learning approaches to email classification may also fall short because (i) the characteristics of malicious files may change over time and (ii) traditional machine learning classifiers may not perform well when given data that lies outside the distribution of the training points used to train them. The instant disclosure, therefore, identifies and addresses a need for improved systems and methods for determining whether malicious files are targeted.

SUMMARY

As will be described in greater detail below, the instant disclosure describes various systems and methods for determining whether malicious files are targeted. In one example, a computer-implemented method for determining whether malicious files are targeted may include (i) applying, to a malware detection structure, a group of sample data points, each sample data point corresponding to at least one of a malicious file known to be targeted and a malicious file known to be non-targeted, (ii) identifying one or more boundaries of the sample data points within the malware detection structure, (iii) determining, after identifying the sample boundaries, that a new data point falls outside of the boundaries, and/or (iv) classifying a malicious file associated with the new data point as non-targeted in response to determining that the new data point falls outside of the sample boundaries.

In one embodiment, the malware detection structure may represent a k-dimensional tree structure. In some examples, the malicious files corresponding to the sample data points may represent malicious emails. Similarly, the malicious file corresponding to the new data point may represent a malicious email.

In one example, identifying the boundaries of the sample data points may include (i) determining that the sample data points within the sample data points corresponding to malicious files known to be targeted fall within a first set of boundaries and (ii) determining that the sample data points within the sample data points corresponding to malicious files known to be non-targeted fall within a second set of boundaries. In this example, determining that the new data point falls outside of the boundaries may include determining that the new data point falls outside of both the first set of boundaries and the second set of boundaries.

In some examples, the disclosed method may further include, after identifying the boundaries (e.g., the first and second set of boundaries), determining that a second new data point falls within the first set of boundaries. In these examples, the disclosed methods may include classifying a malicious file associated with the second new data point as targeted in response to determining that the second new data point falls within the first set of boundaries.

In additional or alternative examples, the disclosed method may further include, after identifying the boundaries (e.g., the first and second set of boundaries), determining that a third new data point falls within the second set of boundaries. In these examples, the disclosed method may include classifying a malicious file associated with the third new data point as non-targeted in response to determining that the third new data point falls within the second set of boundaries.

In one embodiment, applying the sample data points to the malware detection structure may include (i) applying, at a first moment in time, a first set of data points to the malware detection structure (each sample data point within the first set of data points corresponding to at least one of a malicious file known to be targeted and a malicious file known to be non-targeted), and (ii) applying, at a second moment in time, a second set of data points to the malware detection structure (each sample data point within the second set of data points corresponding to at least one of a malicious file known to be targeted and a malicious file known to be non-targeted).

In this embodiment, identifying one or more boundaries of the sample data points may include (i) identifying boundaries for each of the first set of sample data points corresponding to malicious files known to be non-targeted, the first set of sample data points corresponding to malicious files known to be targeted, the second set of sample data points corresponding to malicious files known to be non-targeted, and the second set of sample data points corresponding to malicious files known to be non-targeted, (ii) identifying a change between the boundaries of the first set of sample data points corresponding to malicious files known to be non-targeted and the boundaries of the second set of sample data points corresponding to malicious files known to be non-targeted, (iii) identifying no change between the boundaries of the first set of sample data points corresponding to malicious files known to be targeted and the boundaries of the second set of sample data points corresponding to malicious files known to be targeted, and (iv) in response to determining that a change occurred between the boundaries of the first set of sample data points corresponding to malicious files known to be non-targeted and the boundaries of the second set of sample data points corresponding to malicious files known to be non-targeted and that no change occurred between the boundaries of the first set of sample data points corresponding to malicious files known to be targeted and the boundaries of the second set of sample data points corresponding to malicious files known to be targeted, establishing a policy to classify malicious files associated with new data points that fall outside of previously identified boundaries as non-targeted. Also in this example, classifying the malicious file associated with the new data point as non-targeted may include classifying the malicious file associated with the new data point as non-targeted based on the policy.

In some examples, a spatial location of each data point within the malware detection structure may be based on one or more characteristics of a malicious file corresponding to the data point. In one example, these characteristics may include (i) a file size of the particular malicious file, (ii) content of the particular malicious file, (iii) a topic of the particular malicious file, (iv) a file name of the particular malicious file, (v) a file location of the particular malicious file, (vi) a file path of the particular malicious file, and/or (vii) file metadata of the particular malicious file.

In one embodiment, a system for implementing the above-described method may include (i) an application module, stored in memory, that applies, to a malware detection structure, a group of sample data points, each sample data point corresponding to at least one of a malicious file known to be targeted and a malicious file known to be non-targeted, (ii) an identification module, stored in memory, that identifies one or more boundaries of the sample data points within the malware detection structure, (iii) a determination module, stored in memory, that determines, after identifying the sample boundaries, that a new data point falls outside of the boundaries, (iv) a classification module, stored in memory, that classifies a malicious file associated with the new data point as non-targeted in response to determining that the new data point falls outside of the sample boundaries, and/or (v) at least one physical processor configured to execute the application module, the identification module, the determination module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) apply, to a malware detection structure, a group of sample data points, each sample data point corresponding to at least one of a malicious file known to be targeted and a malicious file known to be non-targeted, (ii) identify one or more boundaries of the sample data points within the malware detection structure, (iii) determine, after identifying the sample boundaries, that a new data point falls outside of the boundaries, and/or (iv) classify a malicious file associated with the new data point as non-targeted in response to determining that the new data point falls outside of the sample boundaries.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
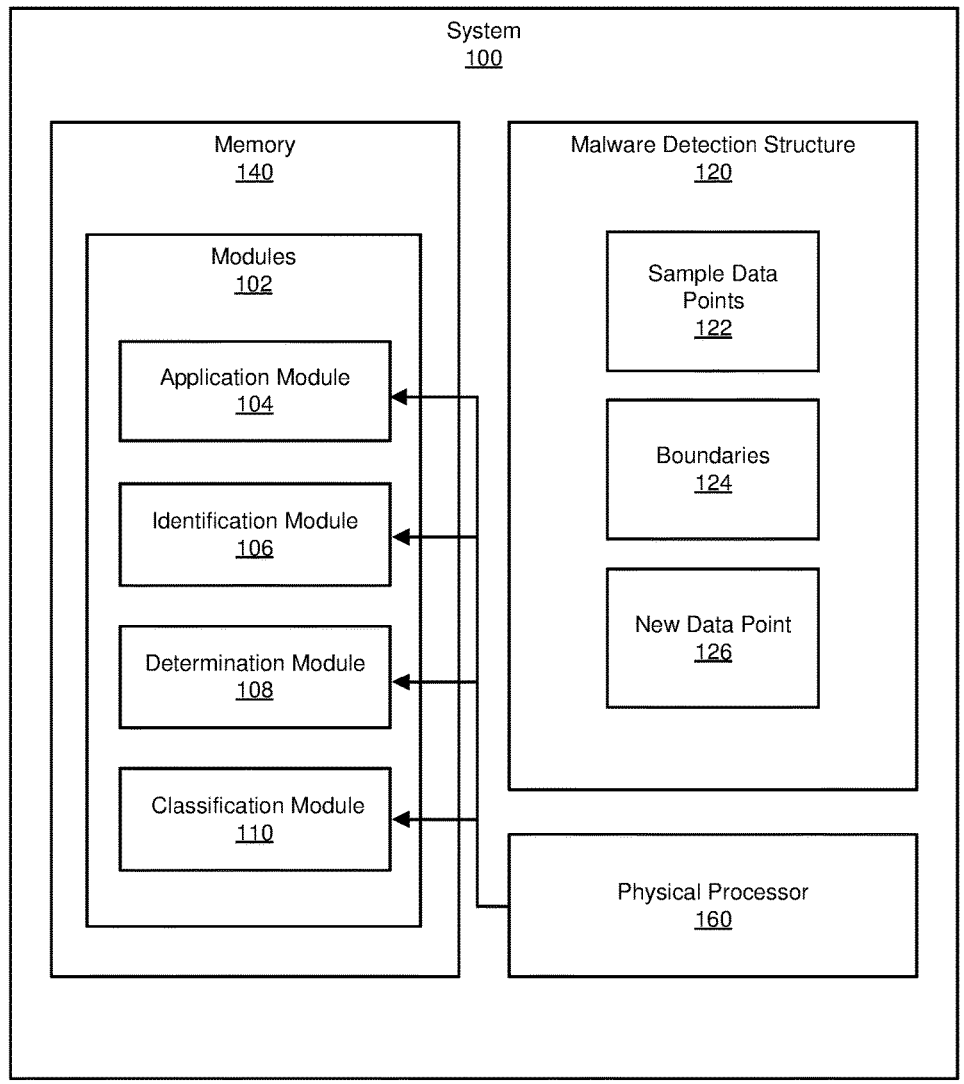
FIG. 1 is a block diagram of an example system for determining whether malicious files are targeted.
Figure 2:
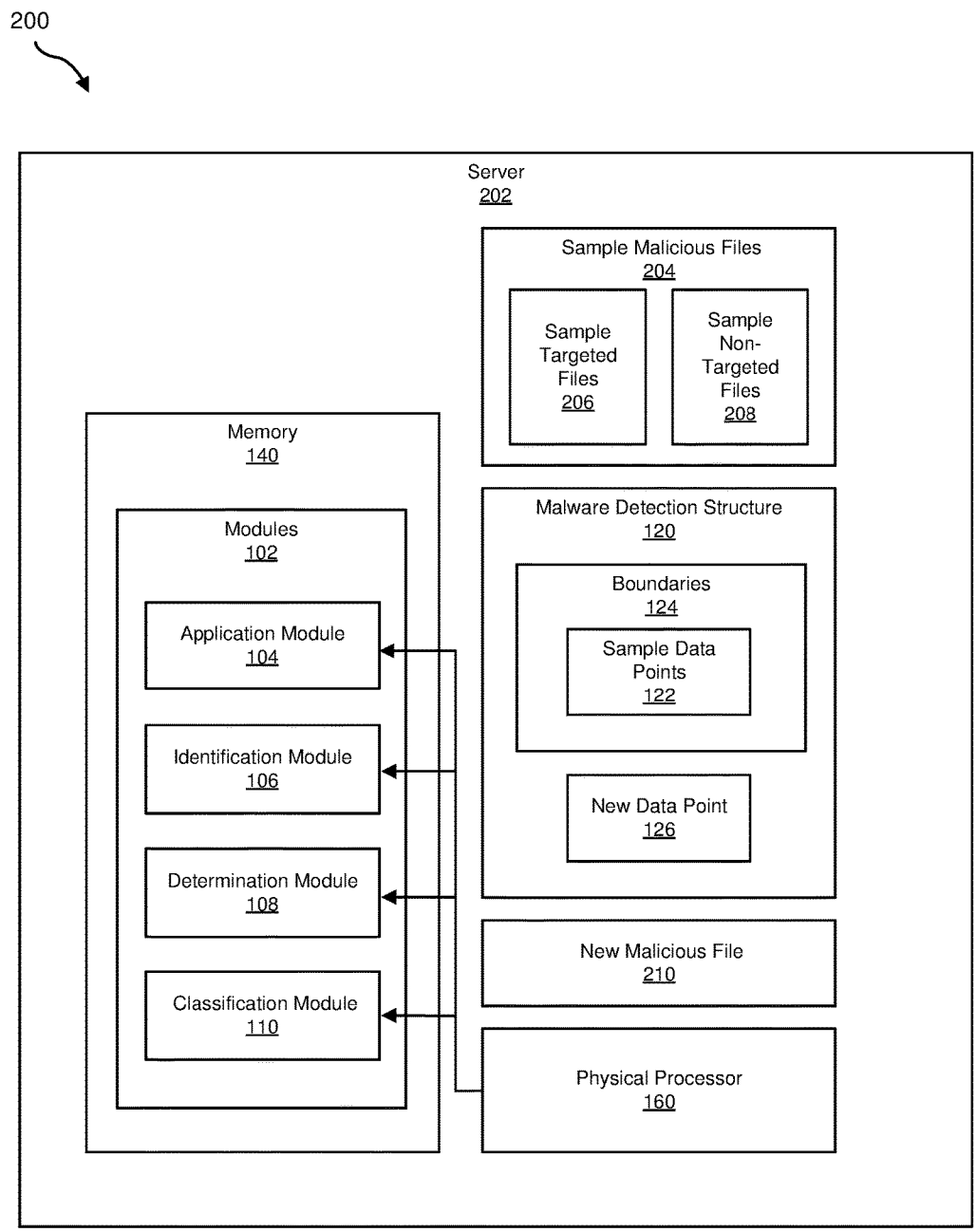
FIG. 2 is a block diagram of an additional example system for determining whether malicious files are targeted.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for determining whether malicious files are targeted. As will be explained in greater detail below, the disclosed systems and methods provide a machine-based protocol for automatically determining whether malicious emails are targeted. This machine-based protocol may include (i) identifying the regions, within a spatial partitioning tree structure, occupied by data points associated with known targeted malicious emails and known non-targeted malicious emails and (ii) determining that new malicious emails associated with data points that do not lie in the same geographic region are non-targeted.

The disclosed protocol exploits properties of targeted attacks identified by the present disclosure (e.g., that the distribution of non-targeted malicious emails changes over time but that the distribution of targeted malicious emails does not change over time). By basing targeted-email classifications on the spatial location of data points associated with emails, the disclosed systems and methods may improve classification accuracy, thereby reducing the number of resulting false positives and/or false negatives, when compared with traditional machine learning approaches and/or manual-labeling approaches.

In addition, the systems and methods described herein may improve the functioning of a computing device by increasing the amount of quickly obtainable information for malicious files encountered by the computing device, thus increasing the likelihood that the computing device will be adequately protected against infection. These systems and methods may also improve the field of heuristic-based computer security by providing a computationally effective computer-implemented technique that filters away test points that come from a different distribution than training points.

The following will provide, with reference to FIGS. 1-2 and 4-6, detailed descriptions of example systems for determining whether malicious files are targeted. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for determining whether malicious files are targeted. As illustrated in this figure, exemplary system 100 may include one or more modules 102 for performing one or more tasks. For example, and as will be explained in greater detail below, exemplary system 100 may include an application module 104 that applies, to a malware detection structure, various sample data points, each sample data point corresponding to at least one of a malicious file known to be targeted and a malicious file known to be non-targeted. Exemplary system 100 may additionally include an identification module 106 that identifies one or more boundaries of the sample data points within the malware detection structure 120. Exemplary system 100 may also include a determination module 108 that determines, after identifying the boundaries, that a new data point falls outside of the boundaries. Exemplary system 100 may additionally include a classification module 110 that classifies a malicious file associated with the new data point as non-targeted in response to determining that the new data point falls outside of the boundaries. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as server 202 illustrated in FIG. 2. One or more of modules 102 in FIG. 1 may also represent all or portions of one or more special-purpose computers configured to perform one or more tasks. In one embodiment, modules 102 may, collectively or individually, be embodied as circuitry that forms part of a larger system, for example, but not limited to, an integrated circuit (IC), a system on-chip (SoC), etc.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 160. Physical processor 160 generally represents any type or form of hardware-implemented processing unit capable of interpreting and/or executing computer-readable instructions. In one example, physical processor 160 may access and/or modify one or more of modules 102 stored in memory 140. Additionally or alternatively, physical processor 160 may execute one or more of modules 102 to facilitate determining whether malicious files are targeted. Examples of physical processor 160 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements, such as malware detection structure 120, sample data points 122, boundaries 124, and/or new data point 126. Malware detection structure 120 generally represents any type or form of space-partitioning data structure. In some examples, malware detection structure 120 may represent a structure capable of organizing points in multi-dimensional space. In some embodiments, malware detection structure 120 may organize sample data points 122 and maintain information describing one or more boundaries 124 around the coordinates within malware detection structure 120 occupied by sample data points 122.

In one example, malware detection structure 120 may represent a k-dimensional tree structure (kd-tree). Kd-trees are further taught and disclosed in "Multidimensional Binary Search Trees used for Associative Searching," which is incorporated herein in its entirety. In this example, a root node of a kd-tree may contain all of the sample data points (i.e., sample data points 122) of a sample dataset and the children of the root node may contain a subset of the points of the sample dataset. As the kd-tree descends, the region of space represented by each node may decrease. At the leaf nodes of the kd-tree, the disclosed systems and methods may calculate probabilities of each class (e.g., targeted or non-targeted) based on the training data. In some examples, the disclosed systems and method may return a default class probability if a test point does not fall within the regions represented by the kd-tree, as will be described in greater detail below.

In some examples, the kd-tree may have been trained on a training dataset with a maximum leaf size. In these examples, each leaf node within the kd-tree may have been associated with class probabilities built on the training points belonging to that leaf node.

Each data point, within sample data points 122, generally represents a point at a spatial location within malware detection structure 120. In some examples, the coordinates of the spatial location may be based on one or more characteristics of a malicious file corresponding to the data point (e.g., where each coordinate corresponds to a particular characteristic). These characteristics may include, without limitation, a file size of a malicious file, content of a malicious file, a topic of a malicious file, a file name of a malicious file, a file location of a malicious file, a file path of a malicious file, file metadata of a malicious file, or any combination thereof. Boundaries 124 generally represent a spatial demarcation within malware detection structure 120 that circumscribes sample data points 122.

Example system 100 in FIG. 1 may be implemented in a variety of ways. For example, all or a portion of example system 100 may represent portions of example system 200 in FIG. 2. In this example, all or a portion of the functionality of modules 102 may be performed by a server 202. As will be described in greater detail below, one or more of modules 102 from FIG. 1 may, when executed by at least one processor of server 202, enable server 202 to determine whether malicious files are targeted. For example, and as will be described in greater detail below, application module 104 may apply, to malware detection structure 120, sample data points 122 that correspond to sample malicious files 204. Identification module 106 may identify one or more boundaries 124 of sample data points 122 within malware detection structure 120. Determination module 108 may determine, after identification module 106 identifies boundaries 124, that new data point 126 falls outside of boundaries 124. Then, classification module 110 may classify new malicious file 210 associated with new data point 126 as non-targeted in response to determining that new data point 126 falls outside of boundaries 124.

Server 202 generally represents any type or form of computing device that is capable of reading computer-executable instructions. In some examples, server 202 may represent a computing device that is capable of providing malware detection functionality. Additional examples of server 202 include, without limitation, security servers, application servers, web servers, storage servers, and/or database servers configured to run certain software applications and/or provide various security, web, storage, and/or database services. Additionally or alternatively, server 202 may represent a laptop, tablet, a desktop, a cellular phone, a Personal Digital Assistant (PDA), a multimedia player, an embedded system, a variation or combinations of one or more of the same, and/or any other suitable computing device. Although illustrated as a single entity in FIG. 2, server 202 may include and/or represent multiple servers that work and/or operate in conjunction with one another.

Each file within sample malicious files 204 generally represents any type or form of resource for storing information that is available to a computer program and that is known to be malicious. In one embodiment, sample malicious files 204 may represent emails. In some examples, each sample malicious file within sample malicious files 204 may correspond to one of the sample data points within sample data points 122.

In one embodiment, sample malicious files 204 may consist of two types of malicious files: malicious files that are known to be targeted (i.e., sampled targeted files 206) and malicious files that are known not to be targeted (i.e., sample non-targeted files 208). As used herein, the term "targeted file" generally refers to a malicious file that is destined for a specific enterprise or industry. Targeted files may be delivered in a variety of ways, including, for example, via emails, port scan attacks, zero day attacks, and/or phishing messages. In some examples, targeted files may have been used as part of an Advanced Persistent Threat. As used herein, the term "non-targeted file" generally refers to a malicious file that is part of a generic global malware campaign.

New malicious file 210 generally represents any type or form of resource for storing information that is available to a computer program and that is known to be malicious, but that is not known to be targeted or non-targeted. In some examples, the purpose of the disclosed systems and methods may be to determine whether new malicious file 210 is targeted or non-targeted. In some examples, new malicious file 210 may represent an email.

Figure 3:
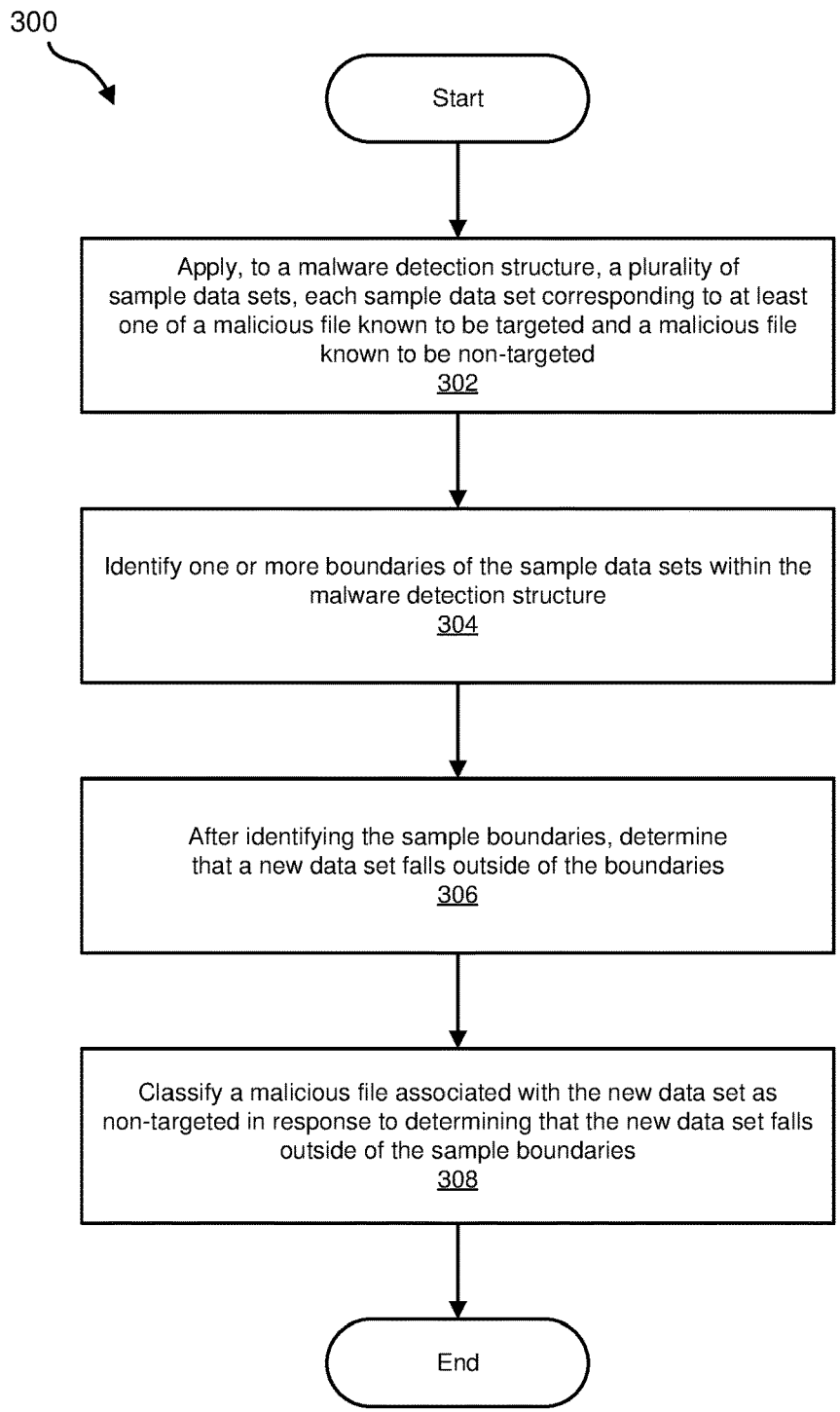
FIG. 3 is a flow diagram of an example method for determining whether malicious files are targeted.

FIG. 3 is a flow diagram of an example computer-implemented method 300 for determining whether malicious files are targeted. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may apply, to a malware detection structure, multiple sample data points, each sample data point corresponding to a malicious file known to be targeted or a malicious file known to be non-targeted. For example, application module 104 may, as part of server 202 in FIG. 2, apply, to malware detection structure 120, sample data points 122, each sample data point within sample data points 122 corresponding to one of sample malicious files 204 (i.e., one of sample targeted files 206 or one of sample non-targeted files 208).

Figure 4:
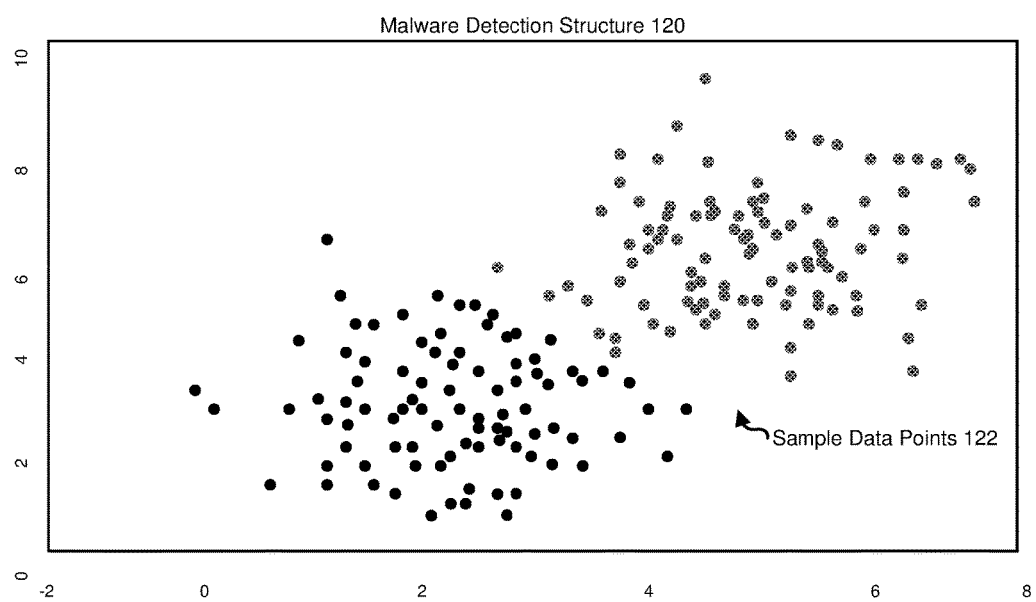
FIG. 4 is a block diagram of an exemplary malware detection structure with various sample data points.

Application module 104 may apply sample data points 122 to malware detection structure 120 in a variety of ways. In some example, a spatial location, within malware detection structure 120, of a data point within sample data points 122 may be based on one or more characteristics of a malicious file corresponding to the data point. FIG. 4 is a specific example of a two-dimensional embodiment of malware detection structure 120 in which sample data points 122 have been plotted in this way.

As illustrated in FIG. 4, a data point plotted within malware detection structure 120 may include information describing the properties of a particular malicious file (i.e., from within sample malicious files 204). In FIG. 4, the depicted x-axis may be associated with a first file characteristic (e.g., file size, etc.) and the depicted y-axis may be associated with a second file characteristic. Thus, in FIG. 4, a data point's x-axis coordinate may provide information about the first characteristic of a particular malicious file and the data point's y-axis may provide information about the second characteristic of the particular malicious file.

In some examples, malware detection structure 120 may include (i) data points representing malicious files that are known to be targeted (illustrated in FIG. 4 with solid data points) and (ii) data points representing malicious files that are known to be non-targeted (illustrated in FIG. 4 with dotted data points). While FIG. 4 represents a two-dimensional version of malware detection structure 120, in other embodiments, malware detection structure 120 may include more than two dimensions.

Returning to FIG. 3, at step 304, one or more of the systems described herein may identify one or more boundaries of the sample data points within the malware detection structure. For example, identification module 106 may, as part of server 202 in FIG. 2, identify one or more boundaries 124 of sample data points 122 within malware detection structure 120.

Figure 5:
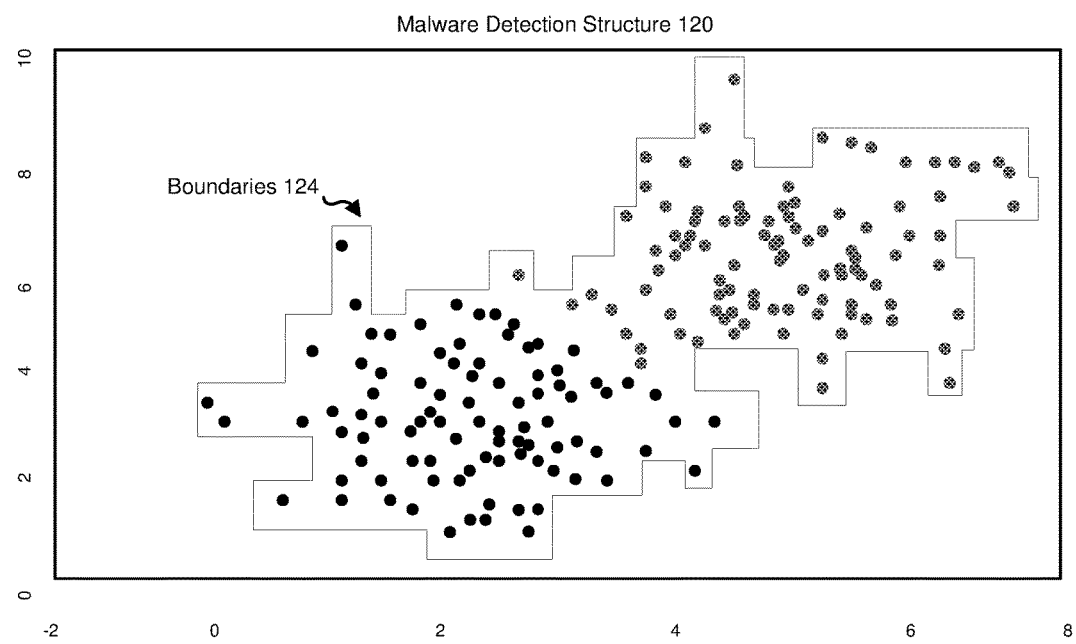
FIG. 5 is a block diagram of an exemplary malware detection structure with various sample data points and sample data point boundaries.
Figure 6:
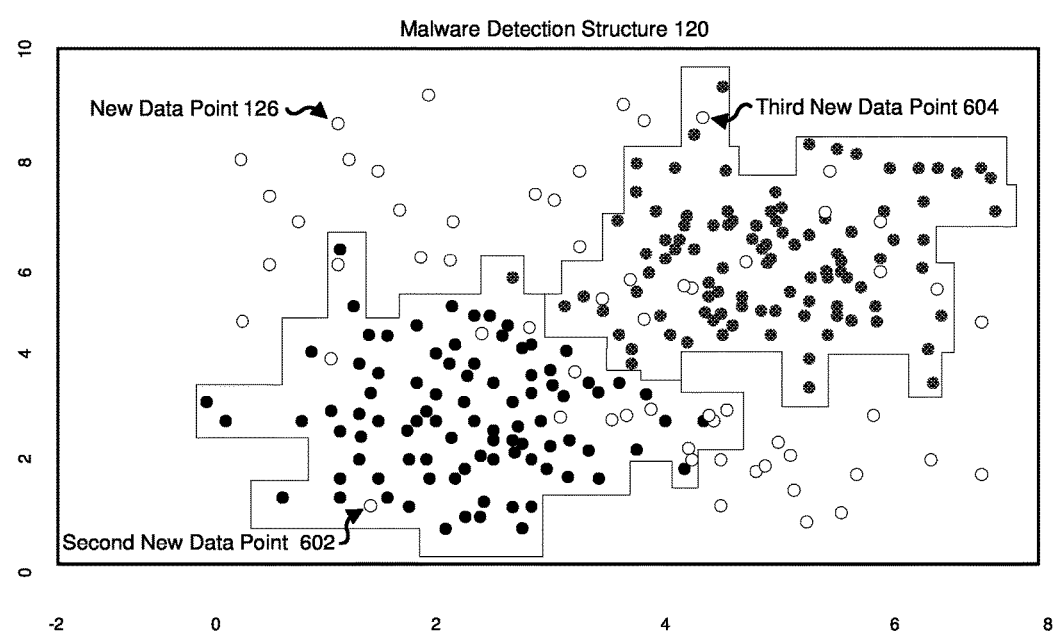
FIG. 6 is a block diagram of an exemplary malware detection structure with various sample data points, sample data points boundaries, and various new data points.

Identification module 106 may identify boundaries 124 in a variety of ways. For example, as shown in FIG. 5, identification module 106 may draw boundaries around the data points corresponding to sample malicious files 204 (i.e., sample data points 122 as illustrated in FIGS. 4-6). In some examples, identification module 106 may identify a first set of boundaries that circumscribe data points corresponding to sample targeted files 206 and a second set of boundaries that circumscribe data points corresponding to sample non-targeted files 208 (see FIG. 6 for an illustration of two sets of boundaries). In some examples, identification module 106 may automatically identify boundaries 124 without user intervention.

Returning to FIG. 3, at step 306, one or more of the systems described herein may determine, after identifying the sample boundaries, that a new data point falls outside of the boundaries. For example, determination module 108 may, as part of server 202 in FIG. 2, determine that new data point 126 falls outside of boundaries 124.

Determination module 108 may determine that new data point 126 falls outside of boundaries 124 in various ways. FIG. 6 shows a variety of new data points (represented by empty dots plotted within malware detection structure 120), including a data point representing new data point 126. In this example, determination module 108 may determine that the coordinates of new data point 126 fall outside of the spatial area circumscribed by boundaries 124.

In some examples, determination module 108 may determine that new data point 126 falls outside of boundaries 124 by determining that new data point 126 falls outside of both a first set of boundaries circumscribing data points associated with sample targeted files 206 (the boundaries circumscribing the solid data points) and a second set of boundaries circumscribing data points associated with sample non-targeted files 208 (the boundaries circumscribing the dotted data points). In one embodiment, determination module 108 may also determine that a second new data point, such as second new data point 602 illustrated in FIG. 6, falls within the first set of boundaries. Additionally or alternatively, determination module 108 may also determine that a third new data point, such as third new data point 604 illustrated in FIG. 6, falls within the second set of boundaries.

Returning to FIG. 3, at step 308, one or more of the systems described herein may classify a malicious file associated with the new data point as non-targeted in response to determining that the new data point falls outside of the sample boundaries. For example, classification module 110 may, as part of computing device 202 in FIG. 2, classify new malicious file 210 associated with new data point 126 as non-targeted in response to determining that new data point 126 falls outside of sample boundaries 124.

In some examples, classification module 110 may classify new data point 126 based on a policy that proscribes classifying as non-targeted malicious files whose corresponding data point falls outside of sample boundaries 124. In some examples, this policy may be based on previously observed properties of malicious files that are targeted and non-targeted. In one example, this policy may be based on an observation that (i) the properties of malicious files that are targeted do no change over time and (ii) the properties of malicious files that are non-targeted do change over time.

To give a specific example, application module 104 may have applied a first set of data points to malware detection structure 120 at a first moment in time, each data point within the first set of data points corresponding to either a malicious file known to be targeted or a malicious file known to be non-targeted. Then, identification module 106 may have identified (i) the boundaries of the sample data points (within the first set of data points) corresponding to malicious files known to be targeted and (ii) the boundaries of the sample data points (within the first set of data points) corresponding to malicious files known to be non-targeted. Sometime later, application module 104 may have applied a second set of data points to malware detection structure 120, each data point within the second set of data points corresponding to either a malicious file known to be targeted or a malicious file known to be non-targeted. Then, identification module 106 may have identified (i) the boundaries of the sample data points (within the second set of data points) corresponding to malicious files known to be targeted and (ii) the boundaries of the sample data points (within the second set of data points) corresponding to malicious files known to be non-targeted.

After identifying the boundaries for second set of data points, identification module 106 may have compared the boundaries that identification module 106 had identified for the first set of data points with the boundaries that identification module 106 had identified for the second set of data points. In comparing the two sets of boundaries, identification module 106 may have identified a change between (i) the boundaries of the first set of sample data points corresponding to malicious files known to be non-targeted and (ii) the boundaries of the second set of sample data points corresponding to malicious files known to be non-targeted. At the same time, identification module 106 may have identified no change between (i) the boundaries of the first set of sample data points corresponding to malicious files known to be targeted and (ii) the boundaries of the second set of sample data points corresponding to malicious files known to be targeted. Based on these observations, the disclosed systems and methods may have created a policy to classify malicious files associated with new data points that fall outside of previously identified boundaries as non-targeted. In this example, classification module 110 may classify the malicious file associated with new data point 126 as non-targeted based on the policy.

In some examples, as described above in connection with step 306, determination module 108 may have determined that second new data point 602, illustrated in FIG. 6, falls within a first set of boundaries that circumscribe data points corresponding to sample targeted files 206. In these examples, classification module 110 may classify malicious files associated with second new data point 602 as targeted in response to determining that second new data point 602 falls within the first set of boundaries that circumscribe data points corresponding to sample targeted files 206.

Additionally or alternatively, as described above in connection with step 306, determination module 108 may have determined that third new data point 604, illustrated in FIG. 6, falls within a second set of boundaries that circumscribe data points corresponding to sample non-targeted files 208. In these examples, classification module 110 may classify malicious files associated with third new data point 604 as non-targeted in response to determining that third new data point 604 falls within the second set of boundaries that circumscribe data points corresponding to sample non-targeted files 208.

As described above in connection with example method 300 in FIG. 3, the disclosed systems and methods are directed, at least in part, at determining whether emails containing malware are (i) targeted to a specific sender or company or (ii) part of a generic global malware campaign. Traditionally, this determination may be made via manual labeling by analysts. However, manual labeling may be difficult to scale. As such, a machine learning approach to classifying malicious emails as targeted or non-targeted (e.g., in which a classifier is trained on previously hand-labeled datasets) may be an attractive alternative. However, as time goes on, the distribution of non-targeted emails may change. Also, conventional machine learning classifiers may not perform well when given new data that lies far outside the distribution of the training points on which the machine learning classifier was trained. Thus, false positive rates may be elevated when using conventional machine learning classifiers to classify malicious emails as targeted or non-targeted.

The disclosed systems and methods propose exploiting the properties of targeted malicious emails and non-targeted malicious emails (namely that the distribution of non-targeted emails may change over time but that the distribution of targeted emails may not change) to accurately classify malicious emails as targeted or non-targeted. In one embodiment, the disclosed systems and methods may build a kd-tree on training data (e.g., data points of malicious emails previously labeled as targeted or non-targeted). In one example, the kd-tree may represent a spatial partitioning tree structure capable of indexing points hierarchically in multidimensional spaces.

After building the kd-tree, the disclosed systems and methods may associate each node in the kd-tree with class probabilities. To give a specific example, if all of the training points in a given kd-tree node have "class 1" (and there are only two classes, "class 0" and "class 1"), then the class probabilities will be 0% for class 0 and 100% for class 1. Then, to perform classification, the disclosed systems and methods may determine whether test points (corresponding to new malicious emails) lie in the region represented by the kd-tree. If a test point lies in the region represented by the kd-tree, the disclosed systems and methods may return the class probabilities associated with the kd-tree node. If a test point does not lie in a region represented by the kd-tree, the disclosed systems and methods may return a default probability.

To give an example, (i) if a test point lies in a region of the kd-tree corresponding to data points of malicious emails known to non-targeted, the disclosed systems and methods may classify a malicious email associated with that test point as non-targeted, (ii) if a test point lies in a region of the kd-tree corresponding to data points of malicious emails known to targeted, the disclosed systems and methods may classify a malicious email associated with that test point as targeted, and (iii) (most interestingly) if a test does not lie within a region represented by the kd-tree, the disclosed systems and methods may, by default, classify a malicious email associated with that test point as non-targeted.

Research indicates that using the disclosed systems and methods may successfully identify non-targeted test points with an extremely low false positive rate. Thus, by using a kd-tree to classify a malicious email as targeted or non-targeted, the disclosed systems and methods may quickly and simply classify malicious emails more accurately than conventional machine learning techniques, which are either very computationally intensive or do not handle non-stationary data well.

Figure 7:
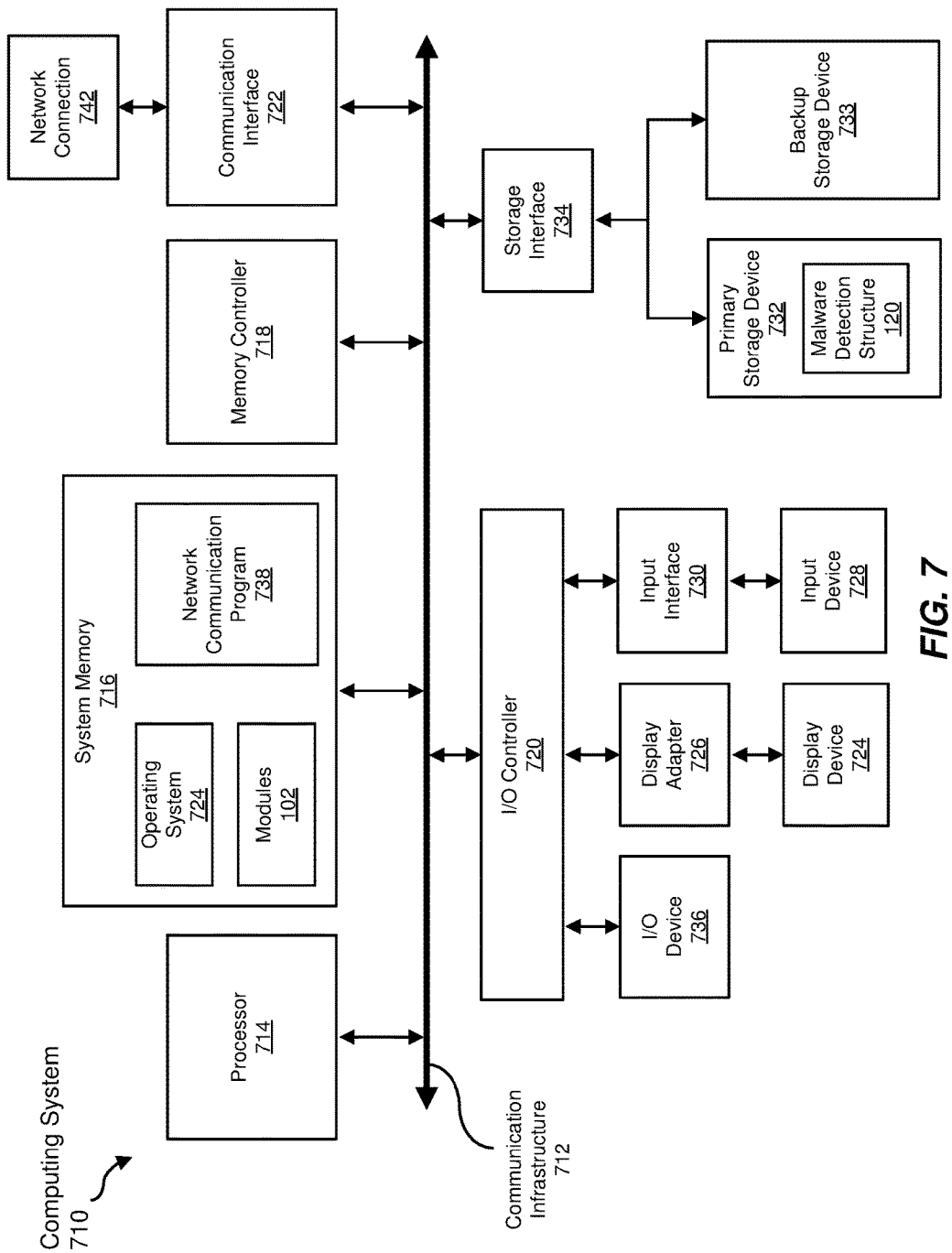
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 724 for execution by processor 714. In one example, operating system 724 may include and/or represent software that manages computer hardware and software resources and/or provides common services to computer programs and/or applications on computing system 710. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, malware detection structure 120 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
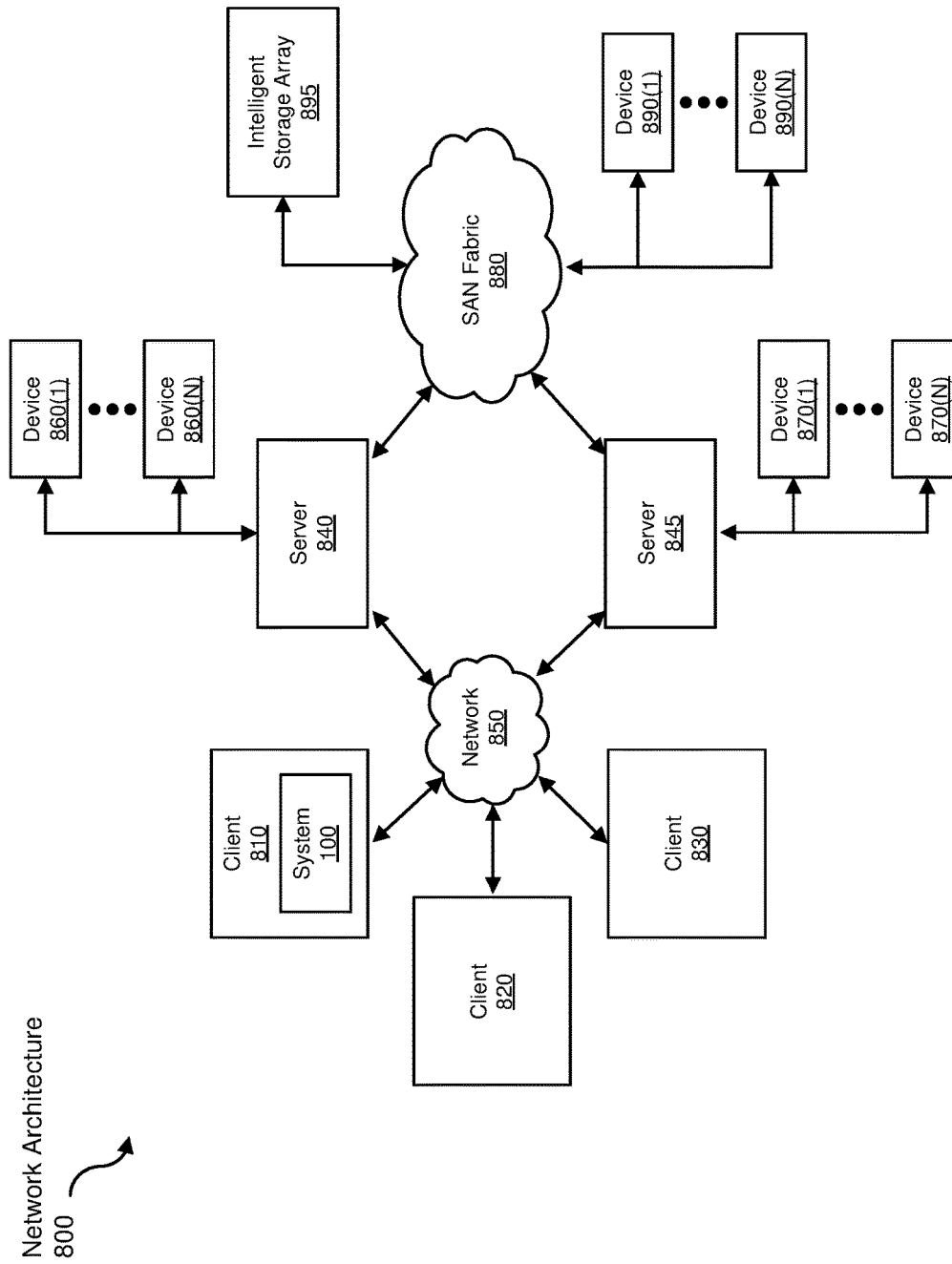
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for determining whether malicious files are targeted.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data relating to a malicious email and transform that data into a targeted classification or a non-targeted classification for the malicious email. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for determining whether malicious files are targeted, at least a portion of the method being performed by a computing device comprising at least one processor, the method comprising:

applying, at a first moment in time, a first set of data points to a malware detection structure, the first set of data points having a first portion in which each data point was generated from a malicious file known to be targeted and a second portion in which each data point was generated from a malicious file known to be non-targeted;

applying, at a second moment in time, a second set of data points to the malware detection structure, the second set of data points having a first portion in which each data point was generated from a malicious file known to be targeted and a second portion in which each data point was generated from a malicious file known to be non-targeted;

identifying boundaries within the malware detection structure for each of the first and second portions of the first and second sets;

determining that there is no difference between the boundaries of the first portions of the first and second sets and that there is a difference between the boundaries of the second portions of the first and second sets;

in response to the determining, establishing a policy to classify malicious files as non-targeted if the malicious files are associated with new data points that fall outside of previously identified boundaries;

after establishing the policy, receiving a new data point, generated from a malicious file encountered by a client device, and determining that the new data point falls outside of the previously identified boundaries;

in accordance with the policy, classifying the malicious file as non-targeted in response to determining that the new data point falls outside of the previously identified boundaries; and using the classification to protect the client device against an infection from the malicious file.

2. The computer-implemented method of claim 1, wherein the malware detection structure comprises a k-dimensional tree structure.

3. The computer-implemented method of claim 1, wherein the malicious files from which the first and second set of data points were generated and the malicious file from which the new data point was generated malicious emails.

4. The computer-implemented method of claim 3, wherein receiving the new data point comprises receiving, over a network, the malicious email from which the new data point was generated.

5. The computer-implemented method of claim 1, wherein determining that the new data point falls outside of the boundaries comprises determining that the new data point falls outside of both the boundaries of the first portions of the first and second sets, corresponding to data points that were generated from malicious files known to be targeted, and the boundaries of the second portions of the first and second sets, corresponding to data points that were generated from malicious files known to be non-targeted.

6. The computer-implemented method of claim 1, further comprising:

after identifying the boundaries, determining that a second new data point falls within the boundaries of the first portions of the first and second sets, corresponding to data points that were generated from malicious files known to be targeted; and classifying a malicious file associated with the second new data point as targeted in response to determining that the second new data point falls within the boundaries of the first portions of the first and second sets.

7. The computer-implemented method of claim 1, further comprising:

after identifying the boundaries, determining that a third new data point falls within the boundaries of the second portions of the first and second sets, corresponding to data points that were generated from malicious files known to be non-targeted; and classifying a malicious file associated with the third new data point as non-targeted in response to determining that the third new data point falls within the boundaries of the second portions of the first and second sets.

8. The computer-implemented method of claim 1, wherein the computing device comprises a security server configured to provide security services to client devices.

9. The computer-implemented method of claim 1, wherein a spatial location of each data point within the malware detection structure is based on one or more characteristics of the malicious file from which the data point was generated.

10. The computer-implemented method of claim 9, wherein the characteristics comprise at least one of:
a file size of the malicious file;
content of the malicious file;
a topic of the malicious file;
a file name of the malicious file;
a file location of the malicious file;
a file path of the malicious file; and
file metadata of the malicious file.

11. A system for determining whether malicious files are targeted, the system comprising:

an application module, stored in memory, that:
applies, at a first moment in time, a first set of data points to a malware detection structure, the first set of data points having a first portion in which each sample data point was generated from a malicious file known to be targeted and a second portion in which each data point was generated from a malicious file known to be non-targeted;

applies, at a second moment in time, a second set of data points to the malware detection structure, the second set of data points having a first portion in which each data point was generated from a malicious file known to be targeted and a second portion in which each data point was generated from a malicious file known to be non-targeted;

an identification module, stored in memory, that identifies boundaries within the malware detection structure for each of the first and second portions of the first and second sets;

a determination module, stored in memory, that:
determines that there is no difference between the boundaries of the first portions of the first and second sets and that there is a difference between the boundaries of the second portions of the first and second sets;

in response to the determining, establishes a policy to classify malicious files as non-targeted if the malicious files are associated with new data points that fall outside of previously identified boundaries;

after establishing the policy, receives a new data point, generated from a malicious file encountered by a client device, and determines that a new data point falls outside of the previously identified boundaries;

a classification module, stored in memory, that:
classifies the malicious file as non-targeted, in accordance with the policy, in response to determining that the new data point falls outside of the previously identified boundaries; and uses the classification to protect the client device against an infection from the malicious file; and at least one physical processor configured to execute the application module, the identification module, the determination module, and the classification module.

12. The system of claim 11, wherein the malware detection structure comprises a k-dimensional tree structure.

13. The system of claim 11, wherein the malicious files from which the first and second set of data points were generated and the malicious file from which the new data point was generated represent malicious emails.

14. The system of claim 13, wherein the determination module receives the new data point by receiving, over a network, the malicious email from which the new data point was generated.

15. The system of claim 11, wherein the determination module determines that the new data point falls outside of the boundaries by determining that the new data point falls outside of both the boundaries of the first portions of the first and second sets, corresponding to data points that were generated from malicious files known to be targeted, and the boundaries of the second portions of the first and second sets, corresponding to data points that were generated from malicious files known to be non-targeted.

16. The system of claim 11, wherein:
after the identification modules identifies the boundaries, the determination module determines that a second new data point falls within the boundaries of the first portions of the first and second sets, corresponding to data points that were generated from malicious files known to be targeted; and
the classification module classifies a malicious file associated with the second new data point as targeted in response to the determination module determining that the second new data point falls within the boundaries of the first portions of the first and second sets.

17. The system of claim 11, further comprising:
after the identification module identifies the boundaries, the determination module determines that a third new data point falls within the boundaries of the second portions of the first and second sets, corresponding to data points that were generated from malicious files known to be non-targeted; and
the classification module classifies a malicious file associated with the third new data point as non-targeted in response to the determination module determining that the third new data point falls within the boundaries of the second portions of the first and second set.

18. The system of claim 11, wherein the application module, the identification module, the determination module, and the classification module operate within a security server configured to provide security services to client devices.

19. The system of claim 11, wherein a spatial location of each data point within the malware detection structure is based on one or more characteristics of the malicious file from which the data point was generated.

20. A non-transitory computer-readable medium comprising one or more computer-readable instructions that, when executed by at least one processor of a computing device, cause the computing device to:
apply, at a first moment in time, a first set of data points to a malware detection structure, the first set of data points having a first portion in which each data point was generated from a malicious file known to be targeted and a second portion in which each data point was generated from a malicious file known to be non-targeted;
apply, at a second moment in time, a second set of data points to the malware detection structure, the second set of data points having a first portion in which each data point was generated from a malicious file known to be targeted and a second portion in which each data point was generated from a malicious file known to be non-targeted;
identify boundaries within the malware detection structure for each of the first and second portions of the first and second sets;
determine that there is no difference between the boundaries of the first portions of the first and second sets and that there is a difference between the boundaries of the second portions of the first and second sets;
in response to the determining, establish a policy to classify malicious files as non-targeted if the malicious files are associated with new data points that fall outside of previously identified boundaries;
after establishing the policy, receive a new data point, generated from a malicious file encountered by a client device, and determine that the new data point falls outside of the previously identified boundaries;
in accordance with the policy, classify the malicious file as non-targeted in response to determining that the new data point falls outside of the previously identified boundaries; and
use the classification to protect the client device against an infection from the malicious file.

* * * * *

UNITED STATES PATENT AND TRADEMARK OFFICE
CERTIFICATE OF CORRECTION

PATENT NO. : 10,216,933 B1
APPLICATION NO. : 15/268260
DATED : February 26, 2019
INVENTOR(S) : Ryan Ross Curtin Page 1 of 1

It is certified that error appears in the above-identified patent and that said Letters Patent is hereby corrected as shown below:

In the Claims

In Column 19, Line 36, Claim 3, delete "malicious" and insert -- represent malicious --, therefor.

In Column 21, Line 44, Claim 17, delete "set." and insert -- sets. --, therefor.

Signed and Sealed this
Seventh Day of May, 2019

Andrei Iancu
*Director of the United States Patent and Trademark Office*